United States Patent [19]
Thylén

[11] Patent Number: 4,717,228
[45] Date of Patent: Jan. 5, 1988

[54] OPTICAL DIRECTIONAL COUPLER WITH AMPLIFICATION

[75] Inventor: Lars Helge Thylén, Huddinge, Sweden

[73] Assignee: Telefonaktiebolaget LM Ericsson, Stockholm, Sweden

[21] Appl. No.: 882,932

[22] PCT Filed: Nov. 18, 1985

[86] PCT No.: PCT/SE85/00462

§ 371 Date: Jun. 27, 1986

§ 102(e) Date: Jun. 27, 1986

[87] PCT Pub. No.: WO86/03306

PCT Pub. Date: Jun. 5, 1986

[30] Foreign Application Priority Data

[SE] Sweden ..............................................

[51] Int. Cl.⁴ .................................................. G02F 1/00
[52] U.S. Cl. .................................. 350/96.14; 350/96.11
[58] Field of Search ............... 350/96.11, 96.13, 96.14, 350/96.15; 333/116

[56] References Cited

U.S. PATENT DOCUMENTS 4,012,113  3/1977  Kogelnik et al. ................. 350/96.13
4,521,069  6/1985  Ikeda ............................. 350/96.14 X

OTHER PUBLICATIONS

J. C. Shelton et al., "Rib Waveguide Switches with MOS Electrooptic Control for Monolithic Integrated Optics in GaAs-Al$_x$Ga$_{1-x}$As", *Applied Optics*, vol. 17, No. 16, Aug. 1978, pp. 2548-2555.

Henry et al., "Spectral Dependence of the Change in Refractive Index Due to Carrier Injection in GaAs Lasers", *J. Appl. Phys.*, vol. 52, No. 7, Jul. 1981, pp. 4457-4461.

*Primary Examiner*—John Lee
*Assistant Examiner*—Michael Menz
*Attorney, Agent, or Firm*—Roberts, Spiecens & Cohen

[57] ABSTRACT

An optical directional coupler with amplification having first, second and third waveguides respectively intended for incoming light for bar coupling of light from the first waveguide and for cross coupling of light from the first waveguide. The waveguides are transparent to the wave length of the incoming light and have a characteristic refractive index in the coupling area. The coupler also includes waveguide sections constituting coupling elements for the first, second and third waveguides as well as electrodes. An arrangement is provided for achieving optical amplification of light passing through the first and the second waveguide in the bar coupling state of the directional coupler and amplification of the light passing through the first and the third waveguides in the cross coupling state of the directional coupler by feeding a current to the electrodes according to which coupling state is desired.

8 Claims, 9 Drawing Figures

OPTICAL DIRECTIONAL COUPLER WITH AMPLIFICATION

FIELD OF INVENTION

The present invention relates to an optical coupler with optical amplification for cross and bar state switching of optical signals together with associated amplification. This kind of coupler may be used in such applications as telephony in the transmission of baseband signals and where the optical transmission medium (fibre) has a certain attenuation per unit length.

BACKGROUND

Optical couplers of, for example, the directional coupler type are already known. These couple an incoming optical signal to one of two outputs as shown, for example, in "Guided Wave Devices for Optical Communication", I.E.E.E. 1981, Vol. QE-17 number 6, pp 946-959. One of the problems with integrated optical directional couplers in lithium niobate ($LiNbO_3$), semiconductors and other materials are the optical losses which allow circuits of only limited complexity to be realizable. Examples of losses in such integrated couplers are 0.5 dB/cm. in lithium niobate and 1 dB/cm. in semiconductors.

In different fibre optical systems, e.g. local networks, bus systems and so on, the minimum given power is a limiting factor in forming the system. To compensate for attenuation in the couplers or branches, an amplification function analogous with that in electronics must be built in. Such a function integrated with the optical coupling in the coupler would thus be of great value. A number of proposals relating solely to light or laser amplification have been reported in the literature, both with amplifiers of the wandering wave type and the Fabry-Pero type as shown, for example, in "Semi-conductor Optical Amplifiers" in I.E.E.E. Spectrum, May 1984 pp 22-33. Typical gain or amplification factors in such known amplifiers are 10-30 dB, for an input signal power of −30 dBm-20 dBm. The known amplifiers mentioned above are discrete amplifier elements.

SUMMARY OF INVENTION

It is an object of the invention to provide a coupler in which, apart from coupling optical signals, an amplification of such signals could also be obtained so that one and the same component effects both coupling and amplification, whereby attenuation of optical signals is avoided.

In achieving the above and other objects of the invention there is provided an optical directional coupler having the possibility of amplification and comprising first, second and third waveguides. The first waveguide serves for incoming light, the second waveguide serves for bar coupling of light from the first waveguide, and the third waveguide serves for cross coupling of light from the first waveguide. The waveguides are transparent for the wave length of the incoming light and have a predetermined characteristic refractive index in the coupling area.

The optical directional coupler further comprises wave guide sections constituting coupling elements for the above-noted waveguides as well as electrodes. In accordance with the invention, there is further provided a device for achieving optical amplification of light passing through the first and second waveguides in the bar coupling state of the directional coupler and optical amplification of the light passing through the first and the third waveguide in the cross coupling state of the directional coupler by feeding a current to the electrodes according to which coupling state is desired, at an alteration of both real and imaginary parts of the refractive index of the respective waveguide sections, an alteration of the imaginary part achieving a amplification and an alteration of the real part achieving an alteration of the state of the coupler for bar coupling or cross coupling of the incoming light.

Other objects, features and advantages of the invention will be found in the Detailed Description which follows hereinafter.

BRIEF DESCRIPTION OF DRAWINGS

The invention will next be described in detail with reference to the accompanying drawings, in which.

DETAILED DESCRIPTION

Figure 1:
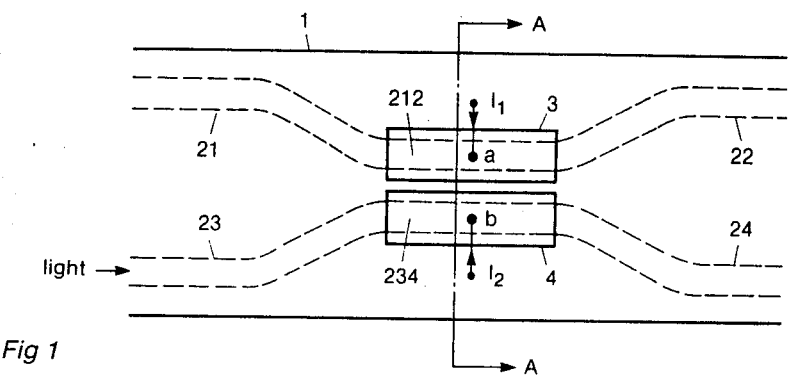
FIG. 1 schematically illustrates an optical coupler in accordance with the invention in a view from above.
Figure 2:
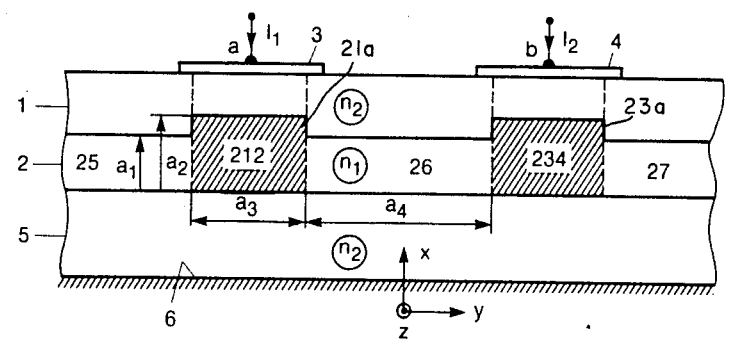
FIG. 2 is a section through coupler along the line A—A in FIG. 1, FIGS. 3a and 3b illustrate state diagrams.

FIGS. 1 and 2 illustrate more closely an embodiment of the invention in the form of a so-called double heterostructure. The structure is seen from above in FIG. 1, where incoming light is taken in via an incoming wave guide 23, wherein the light should:

(a) be either coupled through so that all incoming light is led out via the wave guide 24 and simultaneously amplified, or (b) incoming light through the wave guide 23 is coupled to an outgoing wave guide 22 simultaneously with amplification according to (a).

The coupler itself comprises a structure illustrated in cross section in FIG. 2, and has two metallic electrodes 3 and 4 to which currents I1 and I2 are fed via contact points a and b from an outer (unillustrated) source. The numeral 1 in FIGS. 1 and 2 relates to the uppermost layer of the heterostructure, to which the electrodes 3 and 4 are rigidly attached.

FIG. 2 shows more closely the structure along the section A—A in FIG. 1. Under the uppermost layer 1, which may be a gallium-aluminum-arsenide compound $Ga_{1-x}Al_xAs$, there is a second or intermediate layer 2 consisting of gallium-arsenide GaAs, and under this a third or lower layer 5 of gallium-aluminum-arsenide. A metallic grounding surface 6 for the electrodes 3 and 4 completes the structure.

Both wave guides 21-22 and 23-24 in FIG. 1 are arranged as feed conductors to the coupling area in the illustrated structure. Under the respective electrode 3,4 there are formed so-called rib wave-guides 212 and 234, and these are included in the layer 2; i.e., each light conductor is provided with a protuberance 21a and 23a this provides wave guidance horizontally in the directional coupler. Furthermore the layer 1 is doped with, for example, tin atoms at a doping concentration of $10^{17}/cm^3$ and the layer 2 is doped with a concentration of $10^{16}/cm^3$. For the refractive index n1 and n2 of the respective layers 2 and 1, n1 must be greater than n2. This gives a heterogeneous structure in the vertical direction x. The heterogeneous structure thus gives light wave guidance in the waveguides 21-22 and 23-24. In the remaining parts of the layer 2, there is only strongly attenuated light propagation. The light thus follows the rib formed structure.

If the wave length λ of the light is approximately equal to the band gap Eg for gallium-arsenide, i.e., the band gap for the layer 2, the refractive index n1 will be complex, while the refractive index n2 is real when the light wave length is less than the band gap.

By injecting a current I1 and I2 into the respective electrodes 3 and 4 towards the grounding surface 6, population inversion and stimulated emission (c.f. the relationship in a semiconductor laser) can be obtained in both wave guides.

The wave guide sections 212 and 234 are placed so close to each other that their optical fields overlap each other, whereby a directional coupler structure is obtained. The following dimensions in the structure according to FIG. 2 are given as an example:

$a_1 = 0.53$ μm, $a_2 = 0.63$ μm, $a_3 = 2$ μm, $a_4 = 8$ μm.

In an unpumped state or with the net amplification=1, the wave guide sections 212 and 234 are strongly phase mismatched, so that a negligible coupling of light between the wave guides takes place. This is the so-called "bar-state" of the coupler. When light is coupled from the wave guide 21 to the wave guide 24 in the coupler or when light is coupled from the wave guide 23 to the wave guide 22, i.e. the so-called "cross state", there is generally a certain attenuation of the light, due to its not being possible to couple all incoming light when the coupler does not include amplification.

To enable amplification in the coupler and to obtain the same amplification of the light in both the bar and cross states, a coupler in accordance with the present invention is provided, of which different embodiments are described below.

In a first embodiment, the condition is that in the unpumped state according to the above, the wave guides 21-22, 23-24 are relatively heavily phase mismatched, so that negligible cross coupling takes place. To achieve cross coupling and amplification, the left wave guide section 212 in FIG. 2 is pumped (excitation is always in the right wave guide). The imaginary part in the refractive index n1 then increases (the amplification increases) simultaneously as the real part decreases, e.g., see "Spectral dependence of the change in refractive index due to carrier injection in gallium-arsenide lasers", Journal of Applied Physics, Vol. 52, 1981 pp. 4457-4461. The decrease in the real part of the refractive index in the left wave guide section 212 can be adjusted so that phase matching and cross coupling from the section 234 to the section 212 is obtained as well as amplification. By solely pumping the right wave guide section 234 instead, the phase mismatching according to the above is increased between both wave guide sections. The light will then remain in the right wave guide section 234 and is amplified (the bar state). Examples of amplification and cross talk have been obtained by data simulations on a complete structure are $A_d = 18$ dB and $-25$ dB, respectively.

A further advantage with the component provided in accordance with the invention is that interband interaction is independent of polarization. Most passive couplers for light are based on electro-optical effects, which are generally polarization dependent.

Figure 3:
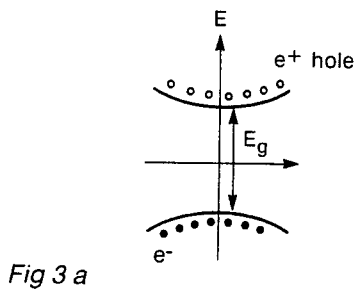
Figure 3:
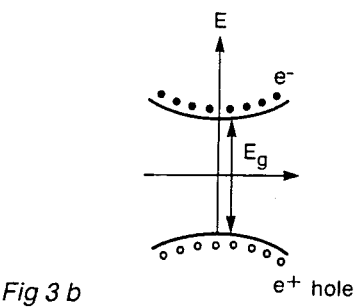

In the bar state coupling, when, for example, the waveguide section 212 is pumped by a current I1 being applied to the electrode 3, there is a migration of electrons over the layer 1b according to FIG. 2 and an excess of electrons is created in the upper band (conduction band) of the waveguide section 212 formed from gallium arsenide. FIGS. 3a, 3b illustrate simplified state diagrams for GaAs where the bandgap is denoted by $E_g$. FIG. 3a illustrates the unpumped state, i.e., a deficiency of electrons in the upper band, while FIG. 3b illustrates an pumped state with the electron excess in the upper band, i.e., the so-called population inversion. When light is incident on the waveguide 23, a transfer of electrons takes place in the pumped state from the conduction band to the valence band by stimulated emission (FIG. 3b), light being emitted in response to the light which is taken through the waveguide 23. The result will be that amplified light leaves the coupler from the waveguide 24. In the cross coupling state, the major part of the incoming light is attenuated through the wave guide 23 and pumping takes place, i.e. current I1 is supplied to the electrode 3, whereby the above-mentioned laser effect (FIGS. 3a, 3b) occurs instead in the waveguides 21 and 22.

Figure 4:
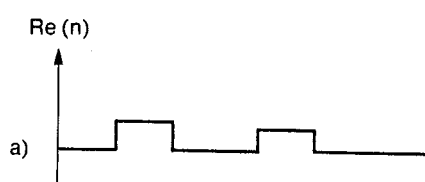
FIG. 4 illustrates examples of diagrams of the refractive index for both the wave guides according to FIGS. 1 and 2, and FIGS. 5 and 6 illustrate diagrams of the amplification of the coupler in the bar coupling state and in the cross coupling state.

Examples are shown in FIG. 4 of the real part of the refractive index n1 for three different states of the coupler in accordance with the invention as follows.

(a) Unpumped state. Phase mismatching.

(b) Cross-coupling state coupling with phase matching. The left wave guide section 212 is pumped, i.e., a current I1 is supplied to the electrode 3 while the current I2 corresponds to the amplification 1.

(c) Bar coupling state and phase mismatching between the light in the waveguides 21 and 23. The right wave guide section 234 is pumped, i.e., I2 differs from O and I1 corresponds to the amplification 1.

The increase of the real part of the refractive index according to FIG. 4(a)-(c) corresponds to the ribs 21a, 23a in FIG. 2. In the case (a), the increase of the refractive index in the waveguides is built into the unpumped structure by the geometrical dimensions of the structure. In case (b), there is a reduction of the refractive index relative to (a) depending on the pumping, and there is the possibility for light to be cross coupled to the waveguide 21. In case (c), there is a reduction of the refractive index for the right waveguide section 234, depending on the pumping, and thus phase mismatching occurs again, and no light is cross coupled, and there is only an amplification in the waveguide section 234. This is the bar coupling state.

Figure 5:
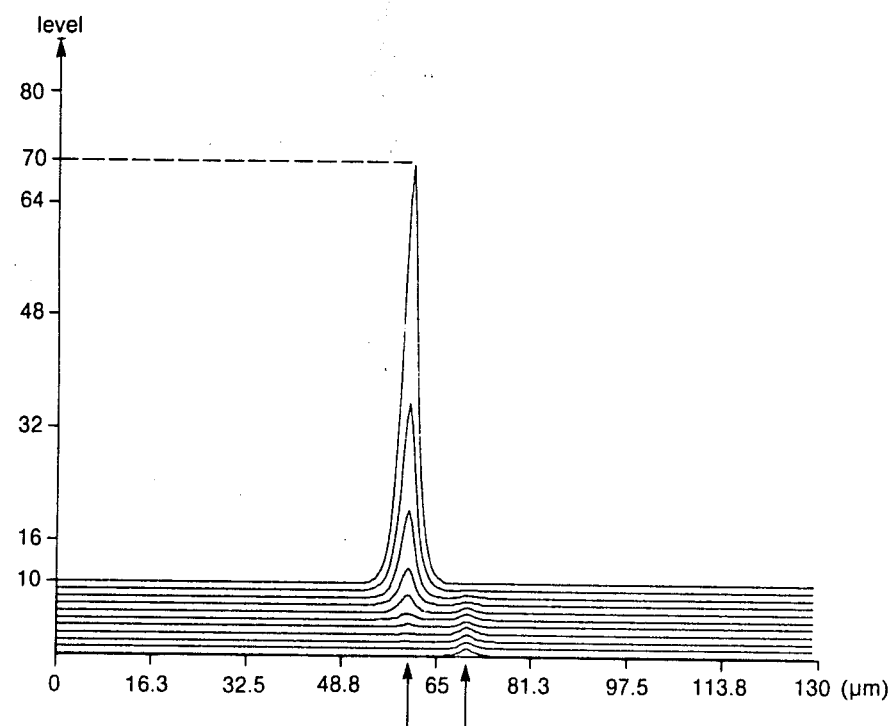

FIG. 5 is a diagram of the amplification in the coupler in the cross coupling state for different propagation lengths through the amplifier structure. It will be seen from the diagram that an amplification of about 18 dB is obtained for cross coupling between channel 2 (wave guide 23) to channel 1 (wave guide 22), while the amplification is negative in channel 2.

Figure 6:
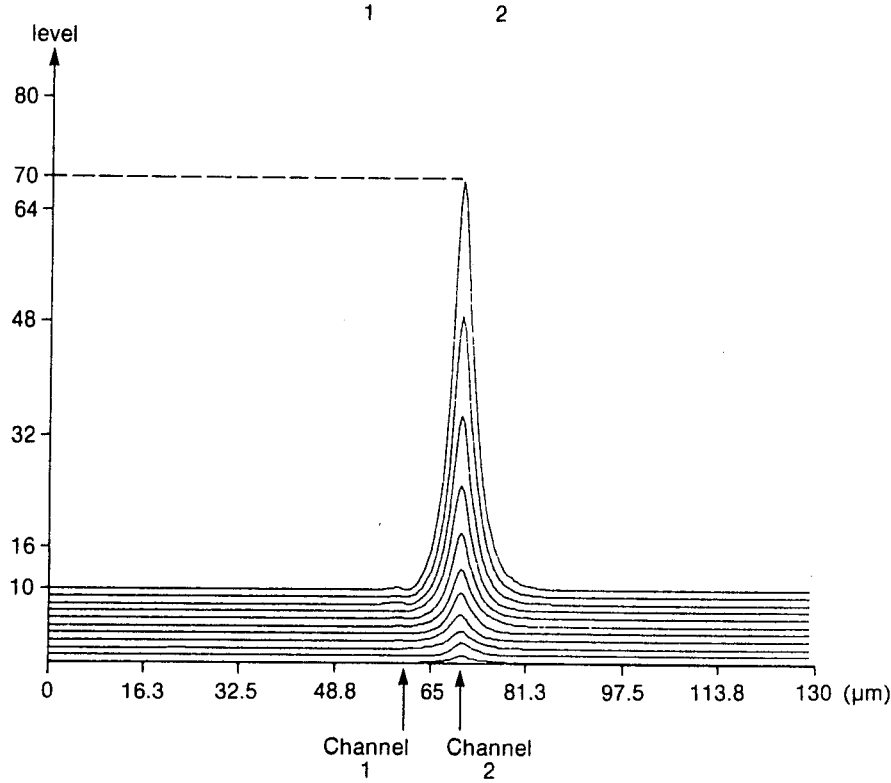

FIG. 6 illustrates the corresponding amplification in the bar coupling state. As will be seen from the diagram, the amplification is about the same for bar state coupling in channel 2 while the light in channel 1 has negative amplification. The diagrams according to FIGS. 5 and 6 thus show that approximately the same amplification is obtained in both states and that the cross coupling is negligible in the bar coupling state and that the bar coupling is negligible in the cross coupling state.

In the embodiments described above, the amplification and transmission properties in the bar and cross coupling states will generally speaking be dependent on which of both waveguides 21 and 23 is selected as the excitation port during pumping, i.e., to which of the guides 21 and 23 the supply of light takes place.

This has been verified in computer simulations. Although the above structure (FIG. 1) is useable to a large extent, a so-called $\beta$-element, i.e. a structure with a cross and bar coupling performance which is independent of the excitation port is even more flexible.

Figure 7:
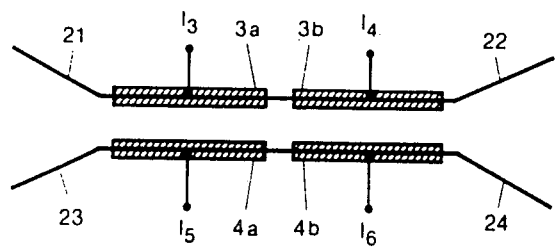
FIGS. 7 and 8 illustrate a second embodiment of an optical coupler according to the invention.

According to another embodiment of the invention, there is obtained a $\beta$-element by the utilization of a two-section coupler (active $\Delta\beta$). FIG. 7 schematically illustrates such a directional coupler. The waveguides 21-24 together with the sections 212, 234 under the respective electrode are of the same structure as in FIGS. 1, 2 and therefore the same denotations have been retained. Both electrodes 3 and 4 in FIG. 1 have each been divided in the structure according to FIG. 7 into two sections $3a$, $3b$ and $4a$, $4b$, but otherwise they are of the same appearance as illustrated in FIG. 2. A current $I_3$, $I_4$, $I_5$, or $I_6$ is supplied to the respective section $3a$, $3b$, $4a$, and $4b$.

Figure 8:
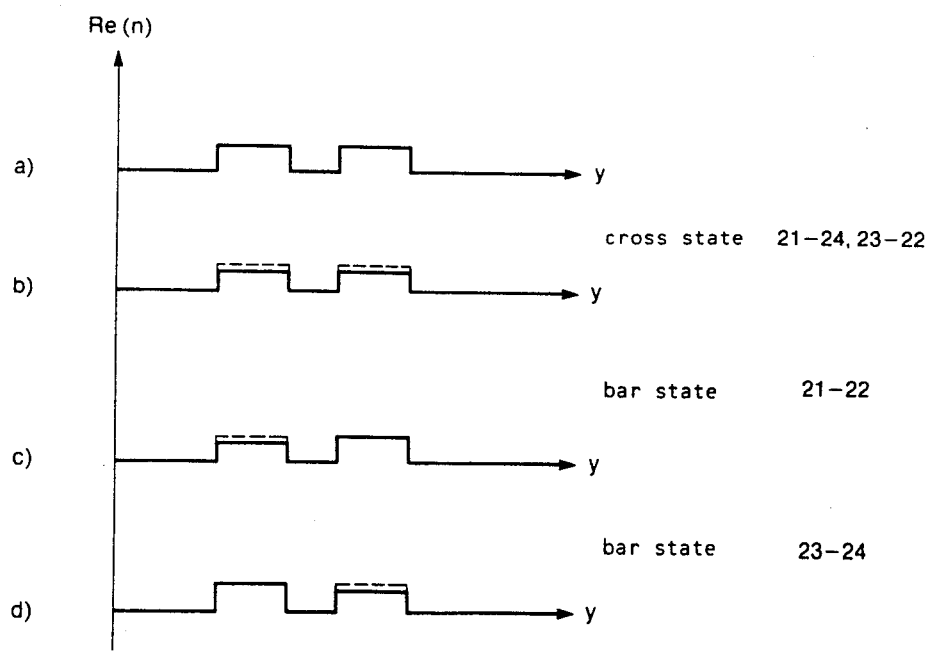

In an unpumped state, the structure illustrated in FIG. 7 is symmetrical with respect to the refractive index, see FIG. 8a. By symmetrical pumping, i.e., $I_3=I_4=I_5=I_6$, the cross coupling state is obtained with a certain amplification, see FIG. 8b. If the same structure is pumped so that $I_3=I_6$ and $I_4=I_5\neq I_3=I_6$, there is obtained a bar coupling state with the same amplification independent of the excitation port (for reasons of reciprocity). FIG. 8c, 8d illustrate the latter case, FIG. 8c illustrating the real part of the index profile in the first longitudinal section and FIG. 8d the index profile in the second longitudinal second. Bar coupling is obtained with the same amplification independent of excitation port (waveguides 21, 23). The dashed lines in FIGS. 8b-d correspond to index profiles according to FIG. 8a, i.e., with all amplification=1 in the structure according to FIG. 7.

The areas 25, 26 and 27 in FIG. 2 and that corresponding in the structure according to FIG. 7 may be made transparent and electrically insulating by ion implantation.

The wave guides 21, 22, 23 and 24 in FIG. 1, as well as their counterparts in FIG. 7 serve as supply conductors for the light and are made transparent for the operation wave length $\lambda$ preferably by their consisting of $Ga_{1-x}Al_xAs$, c.f. areas 1 and 5 in FIG. 2 as discussed above. There is thus obtained a longitudinal heterostructure. The sections 212 and 234 are made transparent by pumping according to what has been described above.

Other embodiments of the invention are also possible, e.g. a separate control of the real part of the refracting index in a structure according to FIG. 1 or 7 for obtaining better crosstalk performance. A further alternative comprises affecting the coupling length during pumping.

What is claimed is:

1. An optical directional coupler with amplification comprising a first waveguide means for receiving and carrying incoming light, a second waveguide means for bar coupling of the light from the first waveguide, and a third waveguide means for cross coupling of the light from the first waveguide means, said waveguide means having a coupling area and being transparent for the wavelength of the incoming light and having a characteristic refractive index in said coupling area, said coupler further comprising waveguide sections constituting coupling elements for said first, second and third waveguide means and comprising electrodes operatively associated with said sections, and means for achieving optical amplification of light passing through the first (23) and the second (24) waveguide means in the bar coupling state of said directional coupler and optical amplification of the light passing through the first (23) and the third (22) waveguide means in the cross coupling state of the directional coupler by feeding a current ($I_1$, $I_2$) to said electrodes (3, 4 or $3a$, $3b$, $4a$, $4b$) according to which coupling state is desired, and by thus achieving an alteration of both real and imaginary parts of the refractive index ($n_1$) of the respective waveguide sections (212, 234), an alteration of the imaginary part achieving an amplification and an alteration of the real part achieving an alteration of the state of the coupler for bar coupling or cross coupling of the incoming light such that the coupler can be switched between the bar and cross coupling states with the same amplification of an incoming light signal.

2. An optical directional coupler as claimed in claim 1, wherein said electrodes include first and second electrodes (3, 4) of which the first electrode (3) is placed at said first (23) and second (24) waveguide means and the second electrode (4) is placed at said third waveguide means (22) for current supply to the respective waveguide sections (212 and 234) to obtain light amplification, and wherein alteration of the real part of the refractive index achieves phase matching between the waveguide sections (212, 234) to obtain cross coupling, and phase mismatching between the waveguide sections (212, 234) to obtain bar coupling.

3. An optical directional coupler as claimed in claim 2, comprising a fourth waveguide means and wherein a first current supplied to said electrodes (3, 4) gives the bar coupling state for incoming light in both the first waveguide means (23) and in said fourth waveguide means (21), and a second current supplied gives the cross coupling state for light in both of said waveguide means (21, 23).

4. An optical directional coupler as claimed in claim 3, wherein the electrodes are divided into at least two sections ($3a$, $3b$; $4a$, $4b$) with said two electrodes being in each section, the cross coupling state with amplification being achieved by symmetric current supply ($I_3=I_4=I_5=I_6$) to the sections, and the bar coupling state with amplification being obtained by a current supply ($I_3=I_6$, $I_4=I_5$) alternating along the electrode structure.

5. An optical directional coupler as claimed in claim 4, wherein the coupling length for the coupled waveguide sections (212, 234) is arranged to be varied with the aid of said current supply to the respective electrodes (3,4; $3a$, $3b$, $4a$, $4b$).

6. An optical directional coupler as claimed in claim 1 comprising a heterostructure within which the waveguides are located, said heterostructure including an upper layer, an intermediate layer and a lower layer, said waveguide sections lying in the intermediate layer and extending into said upper layer, said electrodes being attached to said upper layer, said bottom layer including a metallized layer constituting an electrical ground.

7. An optical directional coupler as claimed in claim 6 wherein said electrodes are superposed above and spaced from said waveguide sections.

8. An optical directional coupler as claimed in claim 6 wherein said intermediate layer is of gallium-arsenide and the upper and lower layers are of gallium-aluminum-arsenide.

* * * * *